(12) United States Patent
Xu et al.

(10) Patent No.: US 12,371,127 B1
(45) Date of Patent: Jul. 29, 2025

(54) THREE-SPEED BICYCLE TRANSMISSION STRUCTURE AND TRANSMISSION METHOD THEREOF

(71) Applicant: Kunshan Zhihu Industrial Technology Co. , Ltd., Kunshan (CN)

(72) Inventors: Shuhu Xu, Kunshan (CN); Xiangyu Yan, Kunshan (CN); Junjian Zhao, Kunshan (CN)

(73) Assignee: KUNSHAN ZHIHU INDUSTRIAL TECHNOLOGY CO., LTD., Kunshan (CN)

( * ) Notice: Subject to any disclaimer, the term of this patent is extended or adjusted under 35 U.S.C. 154(b) by 0 days.

(21) Appl. No.: 18/735,810

(22) Filed: Jun. 6, 2024

(51) Int. Cl.
  *B62M 11/16* (2006.01)
  *F16H 57/08* (2006.01)
(52) U.S. Cl.
  CPC ............. *B62M 11/16* (2013.01); *F16H 57/08* (2013.01); *F16H 57/082* (2013.01); *F16H 2200/0039* (2013.01); *F16H 2200/2005* (2013.01); *F16H 2200/2087* (2013.01)
(58) Field of Classification Search
  CPC .......... B62M 11/16; B62M 11/14; F16H 3/44; F16H 57/08; F16H 57/082; F16H 2200/0039; F16H 2200/2005; F16H 2200/2038; F16H 2200/2087; F16H 2718/08
  USPC ........ 475/258, 259, 317, 318, 293, 297, 320
  See application file for complete search history.

(56) References Cited

U.S. PATENT DOCUMENTS

| | | | | | |
|---|---|---|---|---|---|
| 3,696,690 | A | * | 10/1972 | Schwerdhofer | B62M 11/16 475/259 |
| 3,955,444 | A | * | 5/1976 | Munn | B62M 11/16 475/297 |
| 4,577,531 | A | * | 3/1986 | Bergles | B62M 11/16 192/217.4 |
| 5,562,563 | A | * | 10/1996 | Shoge | B62M 11/18 475/289 |
| 6,354,980 | B1 | * | 3/2002 | Grant | B62M 11/16 280/238 |

* cited by examiner

*Primary Examiner* — Roger L Pang

(57) ABSTRACT

The present invention discloses a three-speed bicycle transmission structure and the transmission method thereof, aiming at overcoming the drawbacks that the overall structure of the prior art cannot support three-speed transmission in a small space and requires high manufacturing costs. The present invention comprises a central shaft, a three-speed transmission structure and a gearbox housing; wherein, the three-speed transmission structure comprises a centrifugal clutch shifting mechanism, a composite planetary gear ring and a first-level transmission mechanism, a second-level transmission mechanism and a third-level transmission mechanism. The centrifugal clutch shifting mechanism is used for shifting among the above three levels of transmission mechanisms to carry out three-speed transmission, and the composite planetary gear ring is used for cooperating with the centrifugal clutch shifting mechanism to realize partial gear shifting. The present invention realizes simplified structure, compressed structure space, improved transmission efficiency and cost saving.

16 Claims, 7 Drawing Sheets

THREE-SPEED BICYCLE TRANSMISSION STRUCTURE AND TRANSMISSION METHOD THEREOF

TECHNICAL FIELD

The present invention relates to the technical field of bicycle gear-shifting structures. More specifically, the present application relates to a three-speed bicycle transmission structure and the transmission method thereof.

BACKGROUND

In recent years, a technological revolution in bicycle electrification has emerged worldwide. The realization of electrification technology in traditional bicycles means the use of new electric parts have been added on the basis of traditional man-powered bicycles, such as motors, batteries, electronic controls, torque sensors and speed sensors. When the cyclist starts, climbs, or encounters greater resistance, the electric system feeds back data collected by the torque sensor to the motor controller, so that the motor can provide the cyclist with auxiliary power to gain better riding experience.

The new technology has greatly improved the acceleration performance of bicycles, and it also requires the transmission to respond in a smarter and faster way. However, the traditional manual control transmissions from the two global giants, Shimano of Japan and SRAM of the United States, is targeted at traditional human-powered bicycles. To gain a more comfortable pedaling frequency; the cyclists are required to judge the time for gear shifting by themselves, and constantly shift gears as the speed varies. Assisted by the electric power technology; it even increases the gear-shifting frequency to serve for comfortable pedaling. The traditional manual control transmission has become a burden instead of help to new technologies.

To overcome the drawbacks, a three-speed transmission method and structure with automatic shifting is proposed particularly to meet the needs of new bicycle technologies. This automatic gear-shifting structure overcomes the draw back of traditional manual control transmissions that require manual gear shifting, and can perfectly match electric bicycles. It is able to automatically shift gears according to the rider's speed and improve the comfort of pedaling.

Its novelty lies in the three-speed transmission that relies on only one set of planetary gear mechanism, which is extremely small in space occupation and parts size. It not only excels in automatic transmission, but also meets the needs for light-weight and low-cost bicycles with high transmission efficiency.

SUMMARY

Accordingly; the main object of the present invention is to provide a three-speed bicycle transmission structure and the transmission method thereof with automatic gear shifting.

To realize the above-mentioned object, the present invention brings forward the technical proposal comprising a central shaft (1), a three-speed transmission structure and a gearbox housing (6), wherein:

the three-speed transmission structure, used for switching output modes and realizing three-speed gear shifting, comprises a centrifugal clutch shifting mechanism (2), a composite planetary gear ring (7) and a planetary transmission mechanism (31); and the centrifugal clutch shifting mechanism (2) is used for switching output modes, the composite planetary gear ring (7) and the planetary transmission mechanism (31) cooperates with the centrifugal clutch shifting mechanism (2) to realize partial gear shifting;

the gearbox housing (6) works to output power.

Further, the three-speed transmission structure includes a first-level transmission mechanism, a second-level transmission mechanism and a third-level transmission mechanism for realizing overall multi-level speed change, and the centrifugal clutch shifting mechanism is used to shift the first-level transmission mechanism, the second-level transmission mechanism and the third-level transmission mechanism for different modes of transmission;

the first-level transmission mechanism and the third-level transmission mechanism are internally provided with a planetary transmission mechanism for realizing the variable-speed transmission of the gearbox housing; and the interior of the planetary transmission mechanism is provided with a composite planetary carrier; the planetary transmission mechanism delivers deceleration transmission in the first-level transmission mechanism, and acceleration transmission in the third-level transmission mechanism;

the three-speed transmission mechanism realizes the different transmission modes of the planetary transmission mechanism through the centrifugal clutch shifting mechanism cooperating with the composite planetary gear ring and the composite planetary carrier;

the second-level transmission mechanism comprises a first centrifugal shifting mechanism for centrifugal clutch shifting, and the third-level transmission mechanism comprises a second centrifugal shifting mechanism for centrifugal clutch shifting;

the first centrifugal shifting mechanism cooperates with the composite planetary gear ring to shift from deceleration transmission to normal transmission, and the second centrifugal shifting mechanism cooperates with the composite planetary carrier to shift from normal transmission to acceleration transmission;

further, the composite planetary gear ring comprises a first gear ring, a second gear ring and a third gear ring fixed to each other, and the three gear rings are concentrically arranged on the axial space of the transmission;

the tooth profile functions of the first gear ring, the second gear ring and the third gear ring are different, and the three gears are adopted with a fixed connected structure;

the tooth profile of the first gear ring is an involute gear, which is an outer gear ring among the three elements for the planetary transmission of the planetary transmission mechanism: while the tooth profile of the second gear ring is an inner ratchet tooth, and the third gear ring is an outer ratchet tooth;

by adopting the above technical proposal, the three-speed transmission is realized by the composite planetary gear ring with a superimposed structure, the planetary transmission mechanism of the composite planetary carrier cooperating with two sets of centrifugal clutch seesaw-style shifting; and only one planetary transmission mechanism is used to realize three-speed transmission by shifting among different input-output modes; a lack of a level planetary mechanism can greatly save the space and weight.

Further, the outer side of the central shaft is fixedly connected with a sun gear, and the interior of the composite planet carrier is rotatably connected with a planet gear set adapted to the sun gear;

the outer side of the planetary gear set mesh and connect with the first gear ring, the inner side of the planetary gear set mesh and connect with the sun gear; the first gear ring together with the planetary gear set installed on the composite planet carrier and the sun gear on the central shaft form a planetary variable-speed transmission structure;

one end of the composite planetary carrier is fixedly connected with a fourth gear ring for cooperating with the second centrifugal shifting mechanism to realize acceleration transmission; and the fourth gear ring is a ratchet ring;

in the above technical proposal, when the planetary gear ring transmits power to the planetary carrier through a planetary mechanism, the planetary mechanism serves for deceleration, and the speed is reduced through the planetary mechanism; the planetary carrier then transmits power to the second-speed drive block through a first-speed one-way clutch or other one-way mechanisms;

further, the first-speed drive mechanism internally comprises a first drive disk rotatably connected to the outer side of the central shaft; and the outer side of the first drive disk is fixedly connected with a first-speed drive block; the outer side of the first-speed drive block is hinged to a first-speed transmission pawl adapted to the second gear ring, and the inner side of the first-speed transmission pawl is provided with a power locking mechanism for reinforcement;

the first-speed drive block is located on the inner side of the second gear ring;

the power locking mechanism internally comprises a mounting shaft fixedly connected to the upper end of the first drive disk; the outer side of the mounting shaft is rotatably connected with a power locking spring, and one end of the power locking spring is closely linked with the outer side of the first-speed transmission pawl;

the first-speed transmission pawl cooperates with the second gear ring to form a locking structure of one-way transmission, and the power locking spring and the first-speed transmission pawl cooperate to form a locking enforcement structure;

a first pawl compression spring for pressing and positioning the first-speed transmission pawl is arranged between the first-speed drive block and the first-speed transmission pawl;

the second gear ring and the first-speed transmission pawl on the outer side of the first drive disk constitute the one-way transmission of the first-speed drive blocks of the first-level transmission mechanism and the second-level transmission mechanism toward the composite planetary gear ring;

further, the first centrifugal shifting mechanism includes a second drive seat fixed on the inside of the gearbox housing, and the side of the second drive seat close to the composite planetary gear ring is fixedly connected with a second-speed drive block; and the second-speed drive block is internally hinged with the second-speed transmission pawl for engaging the third gear ring;

the side of the second-speed drive block close to the second-speed transmission pawl is fixedly connected with a return spring, and the side of the return spring away from the second-speed drive block is hinged with the second-speed transmission pawl;

the third gear ring is unidirectionally connected with the second-speed transmission pawl on the second drive seat, and cooperates with the first centrifugal shifting mechanism to achieve power transmission and disconnection of unidirectional transmission;

an input shaft with one-way clutch is fixedly connected with the composite planetary carrier on the other side of the fourth gear ring, and its function is to realize one-way transmission through the one-way clutch and the second drive seat, and to transmit power in one-way in the first-level transmission mechanism, and to realize overrunning clutch disconnecting the first-speed power transmission in the second-level transmission mechanism and the third-level transmission mechanism;

in the above technical proposal, the present structure arranges the centrifugal mechanism on the output housing, contrary to all similar products of prior art that adopt similar transmission routes and install centrifugal mechanism on the input side;

further, a second-speed centrifugal control mechanism for controlling the second-speed transmission pawl is hinged on the side of the second drive seat close to the composite planetary gear ring;

when the speed of the second-speed centrifugal control mechanism does not reach the set point and does not produce centrifugal clutching, the second-speed transmission pawl shrinks and does not engage with the third gear ring; when the speed of the second-speed centrifugal control mechanism reaches the set point and produces centrifugal clutching, the second-speed transmission pawl springs off and engages with the third gear ring;

in the above technical proposal, when the rotational speed of the hub is lower than the set value, the centrifugal block closes inwardly and drives the clutch plate to rotate; meanwhile, as the downshifting is the process of deceleration, the hub moves faster than the internal drive end under the action of rotation inertia, that is, the pawl driven by the rotating hub moves faster than the internal composite gear ring, and the one-way clutch mechanism enters an overrunning state; and the pawl closely inwardly under the overrunning driving force of the teeth on the ratchet ring, and the synchronous clutch plate locks the pawl under the thrust of the diminished centrifugal force of the centrifugal block, where the power transmission power is interrupted to realize downshifting;

further, the second centrifugal shifting mechanism includes a three-speed transmission pawl, and the three-speed transmission pawl is hinged to the side of the first-speed drive block away from the first-speed transmission pawl;

the second centrifugal compression spring for pressing and positioning the third-speed transmission pawl is arranged between the third-speed transmission pawl and the first-speed drive block;

the outer side of the three-speed transmission pawl is closely linked with the other end of the power locking spring;

the third-speed centrifugal control mechanism for controlling the third-speed transmission pawl is arranged on the side of the first drive disk close to the first-speed drive block;

the fourth gear ring and the first-speed transmission pawl on the inside of the first drive disk combine to form a one-way transmission mechanism;

the composite planetary carrier is fixedly connected with an input shaft with a one-way clutch on the other side of the fourth gear ring, and its function is to realize one-way transmission through the one-way clutch and the second drive seat, and to perform one-way power transmission in the first-level transmission mechanism, and to realize overrunning clutching and disconnection of the first-speed transmission power in the second-level transmission mechanism and the third-level transmission mechanism;

further, when the rotational speed of the third-speed centrifugal control mechanism does not reach the set point and the centrifugal clutching does not occur, the third-speed transmission pawl shrinks and does not engage with the fourth gear ring, and the first-speed transmission pawl engages with the second gear ring;

when the rotational speed of the third-speed centrifugal control mechanism reaches the set point and produces centrifugal clutching, the third-speed transmission pawl springs off and engages with the fourth gear ring, and the first-speed transmission pawl shrinks and breaks away from the second gear ring or overruns the state.

in the above technical proposal, the power transmission pawl is locked under the action of the spring force on the centrifugal mechanism after passing through the limiting stands on the clutch plate, and it cannot be opened, nor transmits power; at this time, the locking spring is pushed to rotate counterclockwise, and the spring pushes downward to give the outer side pawl a greater outward opening spring force, so that the outer side pawl and the outer side ratchet ring maintain a large meshing force, which cannot be overrun easily under the large spring tension force, basically staying in fixed connection; when the inside pawl opens, the spring can rotate inwardly at more angles, and the locking spring has basically no tension on the pawl, so the outer side pawl can close inwardly, realizing clutch overrunning in the third-speed transmission;

further, the gear-shifting method thereof is as follows:

the power is input to the composite planetary gear ring (7) through a sprocket, a belt pulley or a gear, and is output from the composite planetary carrier (32) through the planetary transmission mechanism (31) to realize deceleration transmission as a first speed shift;

the composite planetary gear ring (7) shifts from the deceleration transmission to normal transmission as a second speed shift through collaboration with the first centrifugal shifting mechanism (41);

the composite planetary gear ring (7) shifts from the normal transmission to acceleration transmission as a third speed shift through collaboration with the second centrifugal shifting mechanism (51):

further, the specific gear-shifting states and processes are as follows:

S1: first-speed transmission: power is input to the first drive disk through sprockets, pulleys or gears, and the first-speed transmission pawl on the outer side of the first-speed drive block on the first drive disk is kept open outwardly under the action of the power locking spring and the first pawl compression spring, and transmits power to the ratchet teeth of the composite planetary gear ring; the first gear ring and the second gear ring are fixedly connected; the first gear ring transmits power to the composite planetary carrier through the planetary gear set, the composite planetary carrier then transmits power to the second drive seat through a level of one-way clutch; as the second drive seat is fixedly connected with the gearbox housing, the power is output from the housing;

S2: second-speed transmission: power is input to the first drive disk through sprockets, pulleys or gears, and a centrifugal clutch mechanism is set on the second drive seat: when the second drive seat reaches a set point with the speed of the gearbox housing, the second-speed centrifugal control mechanism acts, the centrifugal block, under the action of the centrifugal force, opens and pushes the clutch plate locking the second-speed transmission pawl to fail, and the second-speed transmission pawl springs off and further engages with the third gear ring; the power is transmitted to the second drive seat and the gearbox housing at a 1:1 transmission ratio; at this time, the output speed of the transmission is consistent with its input speed; as the power is directly transmitted by the planetary gear ring to the second drive seat, the planetary mechanism does not participate in power transmission; the first-speed transmission forms overrunning through the one-way clutch connected with the second drive disk on the composite planet carrier, and the power transmission fails;

S3: third-speed transmission: power is input to the first drive disk through sprockets, pulleys and gears; a second centrifugal shift mechanism is arranged on the first drive disk; when the speed of the first drive disk reaches the design speed of the third-speed transmission, under the action of centrifugal force, the centrifugal block opens and pushes the clutch to unlock the third-speed pawl; and the third-speed transmission pawl is thrown off and opens inwardly; at the same time, the power locking spring compressing the first-speed transmission pawl fails, and the outer side pawl can be closed, and the power is meshed to the fourth gear ring on the composite planet carrier through the pawl; the power is input through the planet carrier, and output through the planetary gear ring; and the planetary gear ring in the preceding second-speed transmission is directly input to the gearbox housing: compared with the second-speed transmission, the third-speed transmission transmits power additionally through the planetary mechanism, and the transmission method through the planetary mechanism is to increase the output speed;

in the above technical proposal, the first-speed transmission realizes deceleration transmission through input from the planetary gear ring and output from the planetary carrier through the planetary transmission mechanism: in the second-speed transmission, the planetary gear ring is directly connected to the hub for power output, and the planetary mechanism does not participate in the work: in the third-speed transmission, the set of planetary mechanism inputs from the planetary carrier, and the power is transmitted to the hub through the composite planetary gear ring of the planetary mechanism, which is an acceleration transmission.

In summary, the beneficial technical effects of the present invention are;

1. different transmission ratios are achieved by adopting a first-level transmission mechanism, a second-level transmission mechanism and a third-level transmission mechanism, using different input modes of a planetary transmission mechanism; the present invention provides a novel transmission structure and the transmission method thereof based on the basic principles of planetary transmission; by using only one set of planetary transmission mechanism to assist two sets of centrifugal clutch shifting mechanisms, automatic three-speed transmission is realized, which changes the prior art that the three-speed transmission in the industry must be realized by a two-level planetary transmission mechanism; the elimination of a level of planetary mechanism not only compresses the space, but also lifts the transmission efficiency and greatly reduces the cost and weight: considering the limited space and lightweight requirements of the two-wheeled vehicles, the present invention has outstanding invention value, and delivers a simplified structure with compressed structural space, increased transmission efficiency and reduced costs;

2. a power locking spring is used: in the first-speed transmission and the second-speed transmission, the inner side pawl is locked by the clutch plate, and the locking spring is pushed outwardly, and the outer side pawl remains normally open under the interference of the spring, which is equivalent that the outer side pawl losses the one-way transmission function and plays the role of fixed connection, resulting in stable gear shifting effect;

3. a second-speed centrifugal control mechanism and a third-speed centrifugal control mechanism are adopted; when the speed is less than the set value, the centrifugal force of the centrifugal block is less than the force of the return spring, and the centrifugal block closes inwardly to push the clutch plate to rotate clockwise; meanwhile, in the deceleration state, the hub housing works faster than the input end under the rotation inertia, that is, the ratchet ring rotates faster than the pawl, and the gear ring pushes off the pawl, and the clutch plate just clutches into the pawl under the force of the centrifugal block shrinking inwardly; as a result, the pawl enters a closed state, and the transmission power is disconnected and upshift occurs; the area of clutch overrunning caused by the previous upshift meshes and produces a stable downshifting effect.

EMBODIMENTS

The present invention is described in further detail below in connection with the drawings.

Embodiment 1

Figure 1:
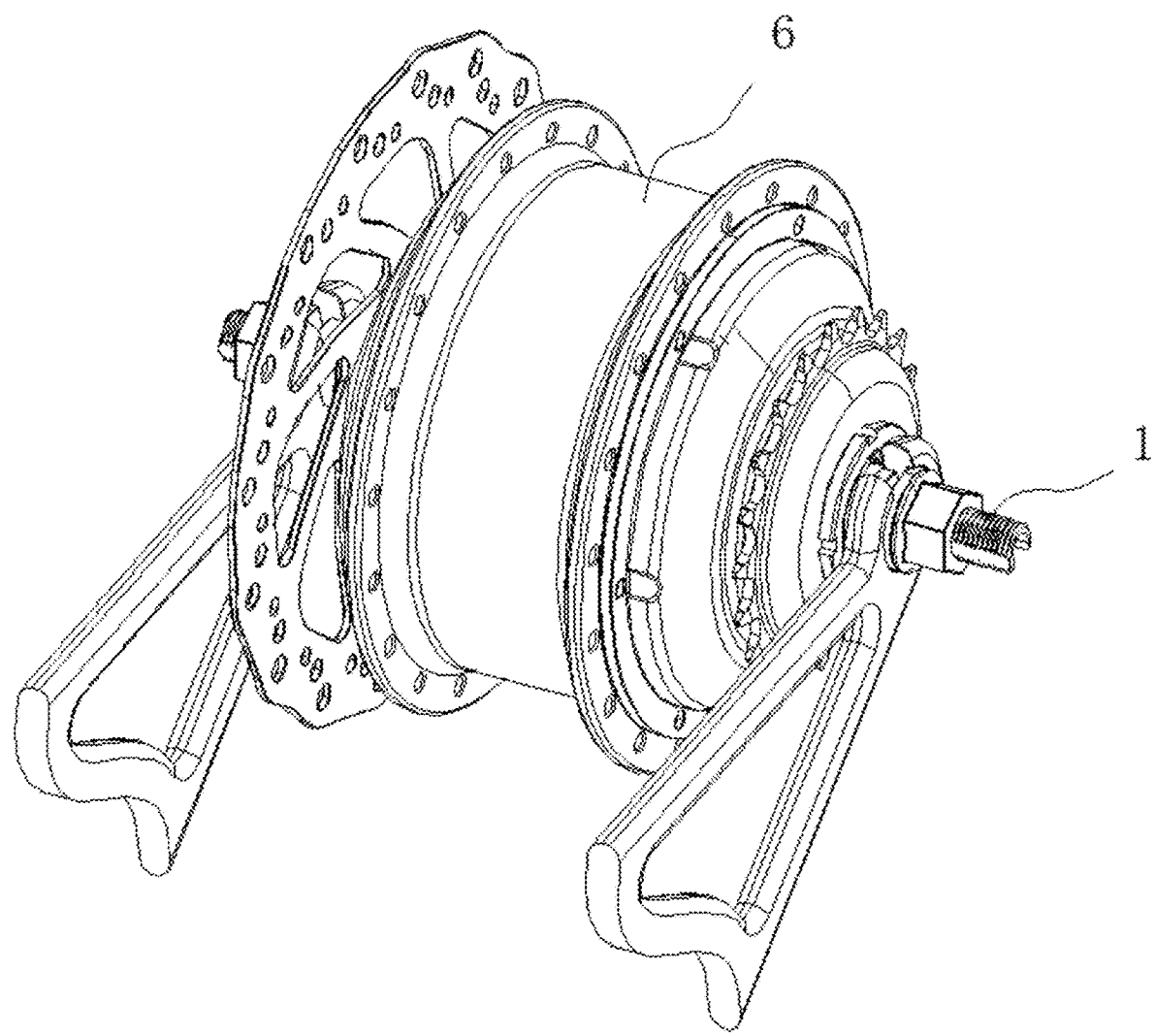
FIG. 1 is a three-dimensional view of the present invention.
Figure 2:
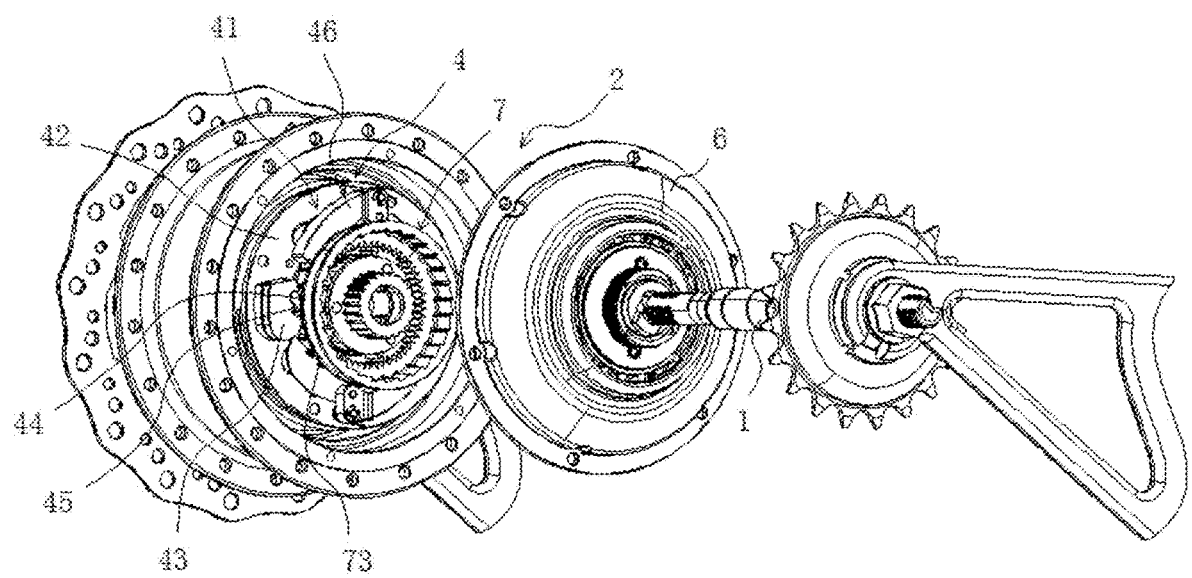
FIG. 2 is an exploded view of the present invention.

Referring to FIG. 1 and FIG. 2, a three-speed bicycle transmission structure comprises the central shaft 1, the three-speed transmission structure and the gearbox housing 6 for power output. The three-speed gear-shifting structure includes the centrifugal clutch shifting mechanism 2 for switching output modes and the composite planetary gear ring 7 cooperating with the centrifugal clutch shifting mechanism 2 to realize partial gear shifting. The three-speed gear-shifting structure further includes the first-level transmission mechanism 3, the second-level transmission mechanism 4 and the third-level transmission mechanism 5 for realizing integral multi-speed transmission. The centrifugal clutch shifting mechanism 2 is used for shifting among the above transmission mechanisms and to carry out different modes of transmission. The first centrifugal shifting mechanism 41 cooperating with the composite planetary carrier 7 is intended for shifting the deceleration transmission into normal transmission, and the second centrifugal shifting mechanism 51 cooperating with the composite planetary carrier 32 is intended for shifting the normal transmission into acceleration transmission.

When the hub rotation reaches the design speed, the centrifugal force of the centrifugal block exceeds the spring force, and the centrifugal block opens and drives the clutch plate to rotate counterclockwise, and the pawl locking position on the clutch plate fails, the second-speed pawl springs off and engages with the inner ratchet composite planetary third gear ring 73; as a result, the second drive seat and the inner ratchet composite planetary third gear ring 73 carry out power transmission. The transmission speed at this time is faster than the output speed of the previous first-speed transmission through the planetary mechanism. As the power is transmitted through a one-way clutch between the original planetary carrier and the second drive seat, when the second drive seat moves faster than the planetary carrier end, the clutch overrunning takes place, and the first-speed transmission fails, and the transmission power is replaced by the second-speed transmission, and the output speed is consistent with the input speed, the planetary mechanism does not participate in power transmission. The first-level transmission mechanism 3 and the third-level transmission mechanism 5 include the planetary transmission mechanism 31 for realizing the variable-speed transmission of the gearbox housing 6. The planetary transmission mechanism 31 includes the composite planetary carrier 32. The planetary transmission mechanism 31 acts for deceleration transmission and acceleration transmission separately in the first-level transmission mechanism 3 and the third-level transmission mechanism 5 respectively. The three-speed transmission mechanism realizes the transmission of the planetary transmission mechanism 31 in different ways through the centrifugal clutch shifting mechanism 2 cooperating with the composite planetary gear ring 7 and the composite planetary carrier 32. The second-level transmission mechanism 4 includes the first centrifugal shifting mechanism 41 for centrifugal clutch gear-shifting. The third-level transmission mechanism 5 includes the second centrifugal shifting mechanism 51 for centrifugal clutch shifting. The first centrifugal shifting mechanism 41 cooperates with the composite planetary gear ring 7 to shift the deceleration transmission into normal transmission. The second centrifugal shifting mechanism 51 cooperates with the composite planetary carrier 32 to shift the normal transmission into acceleration transmission. When the speed of the third-speed centrifugal block reaches the design speed, the centrifugal block opens to push the clutch plate to rotate counterclockwise as shown in the figure. The third-speed pawl breaks away from the clutch plate locking, and springs off inwardly; and engages with the ratchet teeth on the internal planetary carrier. At this time, the first-level drive seat directly transmits power to the planetary carrier. The original planetary deceleration mechanism shifts to the mode that the sun gear is fixed, the planetary carrier inputs, and the third gear ring 73 outputs. The output speed becomes higher than the input speed. The specific acceleration ratio can be adjusted by different gear parameters. Power is transmitted to the hub housing through the planetary gear ring outputting power to connect with the rear-end power output route of the preceding second-speed planetary gear ring. However, the opening of the third-speed pawl results in the inwardly rotation of the pawl locking spring, and the force originally exerted to the first-speed pawl disappears, resulting in clutch overrunning; and the power transmission route of the original second-speed pawl shifts from the output of the first-speed pawl to that of the third-speed pawl, realizing the third-speed transmission.

Figure 4:
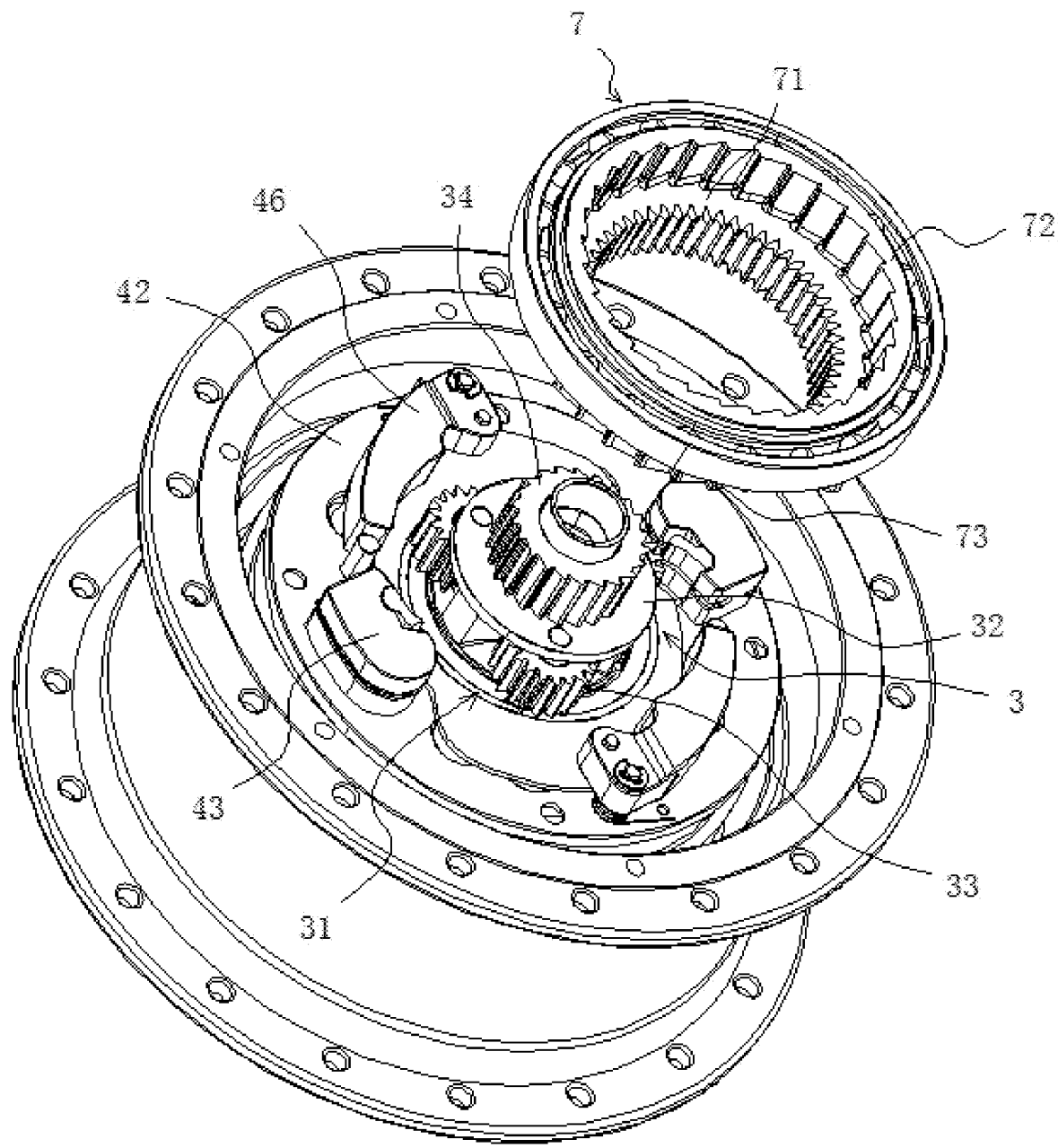
FIG. 4 is an exploded view of the composite planetary gear ring of the present invention.

Referring to FIG. 4, the composite planetary gear ring 7 internally includes the first gear ring 71, the second gear ring 72 and the third gear ring 73 fixed to each other. The three gear rings are concentrically arranged in the axial space of the transmission. The tooth profile functions of the first gear ring 71, the second gear ring 72 and the third gear ring 73 are different. The first gear ring 71, the second gear ring 72 and the third gear ring 73 are fixed connection structures. The tooth form of the first gear ring 71 is an involute gear. which is an outer gear ring among the three elements for the planetary transmission of the planetary transmission mechanism 31. The second gear ring 72 is in the tooth form of an inner ratchet, and the third gear ring 73 an outer ratchet. The tooth number of the composite planetary gear ring 7 can be adjusted according to the actual situation, so as to ensure that the overall rotational speed can be adjusted in manufacturing.

Figure 3:
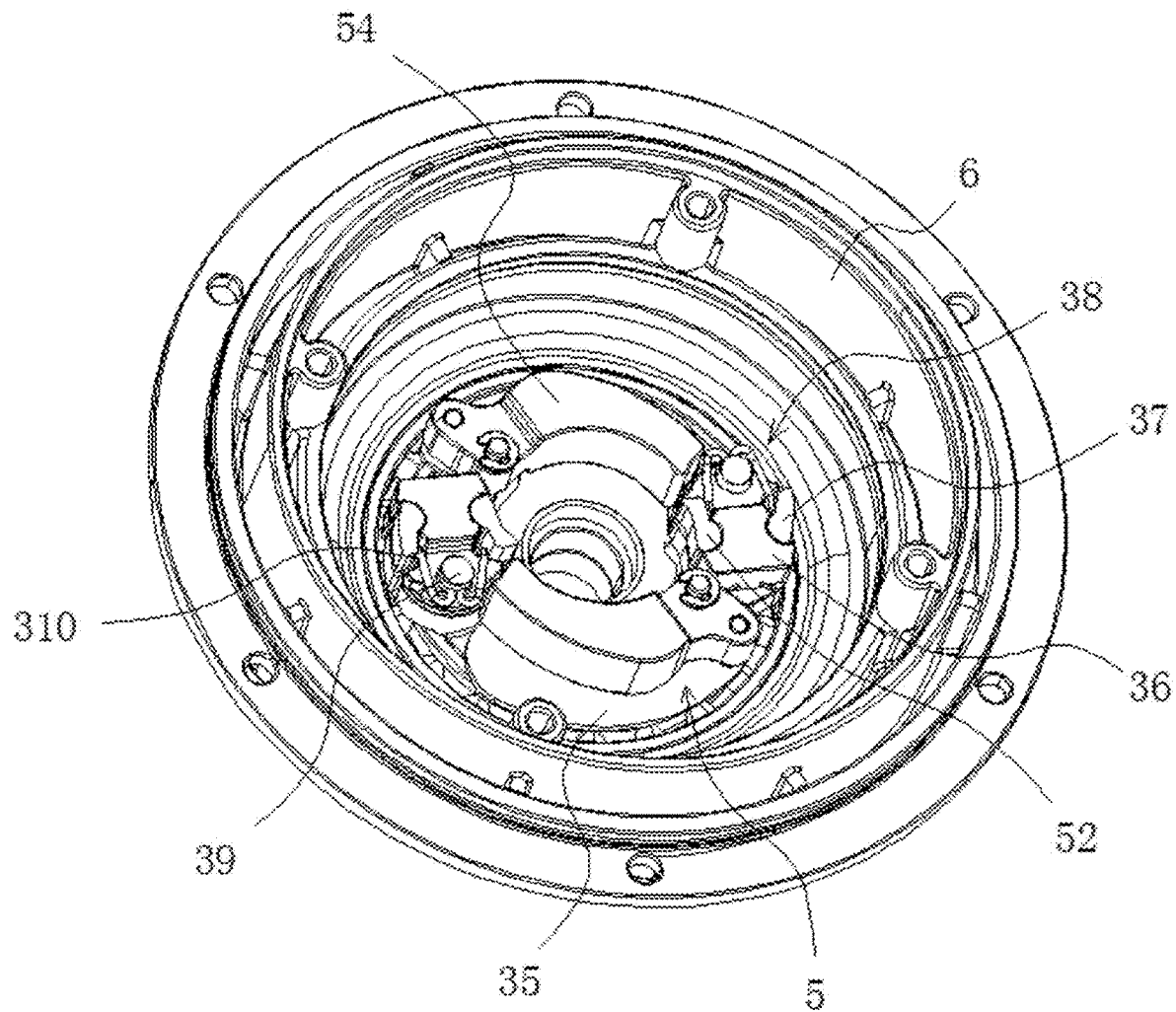
FIG. 3 is a view of the combined structure of the first-speed transmission and third-level transmission mechanisms of the present invention.
Figure 5:
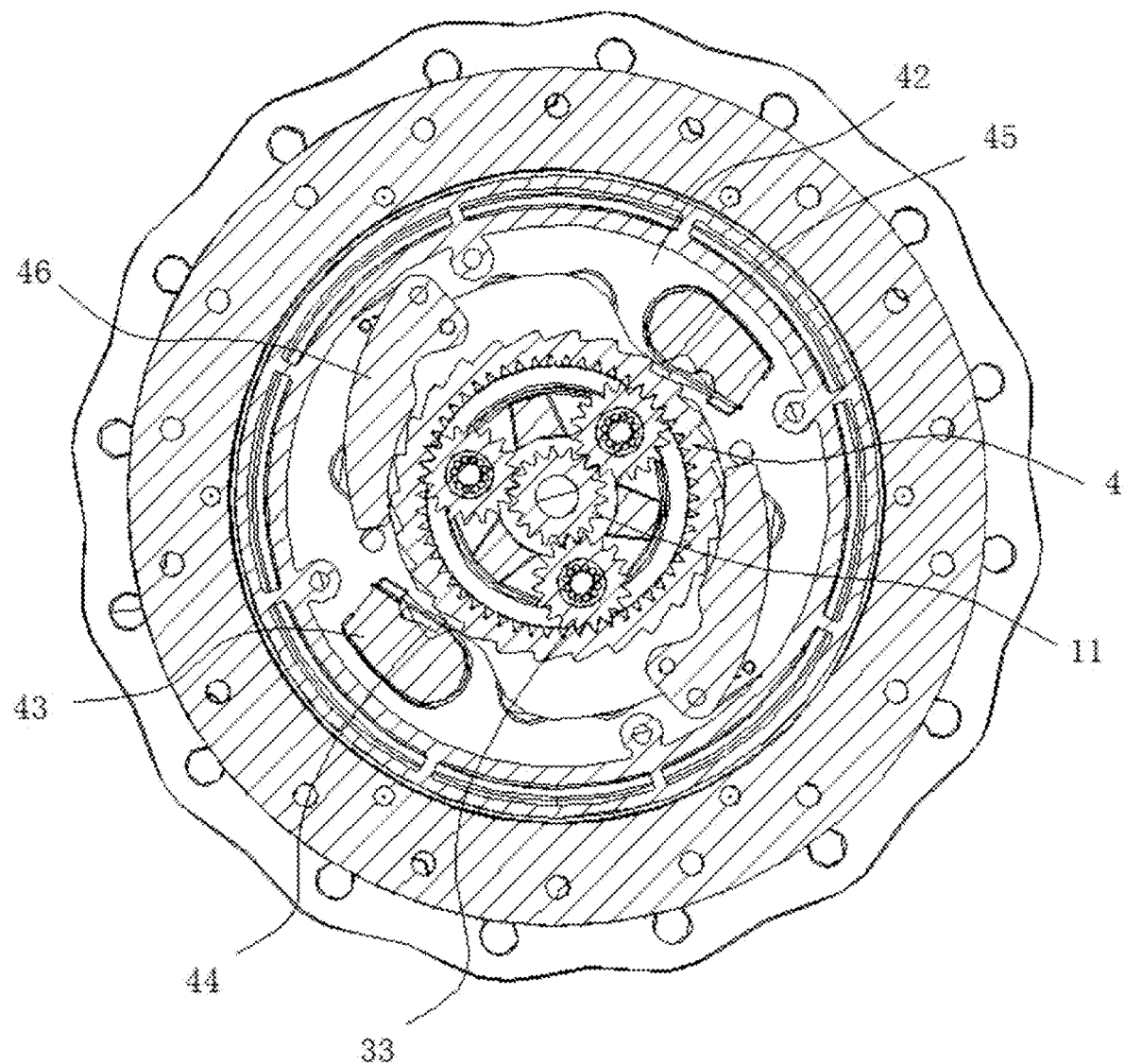
FIG. 5 is a cross-sectional view of the secondary transmission mechanism of the present invention.

Referring to FIG. 3 and FIG. 5, the sun gear 11 is fixedly connected to the outer side of the central central shaft 1. The planetary gear set 33 adapted to the sun gear 11 is rotatably connected to the inner side of the composite planet carrier 32. The outer side of the planetary gear set 33 meshes with the first gear ring 71, and the inner side of the planetary gear set 33 meshes with the sun gear 11. The first gear ring 71 and the planetary gear set 33 that is fixedly connected to the composite planet carrier 32, and the sun gear 11 on the central shaft 1 form the planetary variable-speed transmission structure. One end of the composite planet carrier 32 is fixedly connected to the fourth gear ring 34 for cooperating with the second centrifugal shifting mechanism 51 to realize acceleration transmission. The fourth gear ring 34 is a ratchet ring. The first-speed transmission 3 includes inside the first drive disk 35 rotatably connected to the outer side of the central shaft 1. The outer side of the first drive disk 35 is fixedly connected with the first-speed drive block 36 that is hinged to the outer side first-speed transmission pawl 37 adapted to the second gear ring 72. A power locking mechanism 38 for reinforcement is provided on the inner side of the first-speed transmission pawl 37. The first-speed drive block 36 is located on the inner side of the second gear ring 72. The power locking mechanism 38 includes the mounting shaft 39 fixed on the upper end of the first drive disk 35, and the outer side of the mounting shaft 39 is rotatably connected with the power locking spring 310: one end of the power locking spring 310 is closely linked with the outer side first-speed transmission pawl 37. The first-speed transmission pawl 37 cooperates with the second gear ring 72 to form a one-way transmission locking structure, and the power locking spring 310 cooperates with the first-speed transmission pawl 37 to form a locking enforcement structure. The first pawl compression spring 311 for pressing and positioning the first-speed transmission pawl 37 is provided between the first-speed drive block 36 and the first-speed transmission pawl 37. The second gear ring 72 and the first-speed transmission pawl 37 on the outer side of the first drive disk 35 form the one-way transmission of the first-speed drive blocks of the first-level transmission mechanism 3 and the second-level transmission mechanism 4 toward the composite planetary gear ring 7. Preferably, the power locking mechanism 38 adopts the power locking spring 310 which is one of the varied locking structures, and the optimal structure is used in the present design; the first-speed transmission pawl 37 cooperates with the second gear ring 72 to form a locking structure of one-way transmission, and the power locking spring 310 cooperates with the first-speed transmission pawl 37 to form a locking reinforcement structure.

Figure 6:
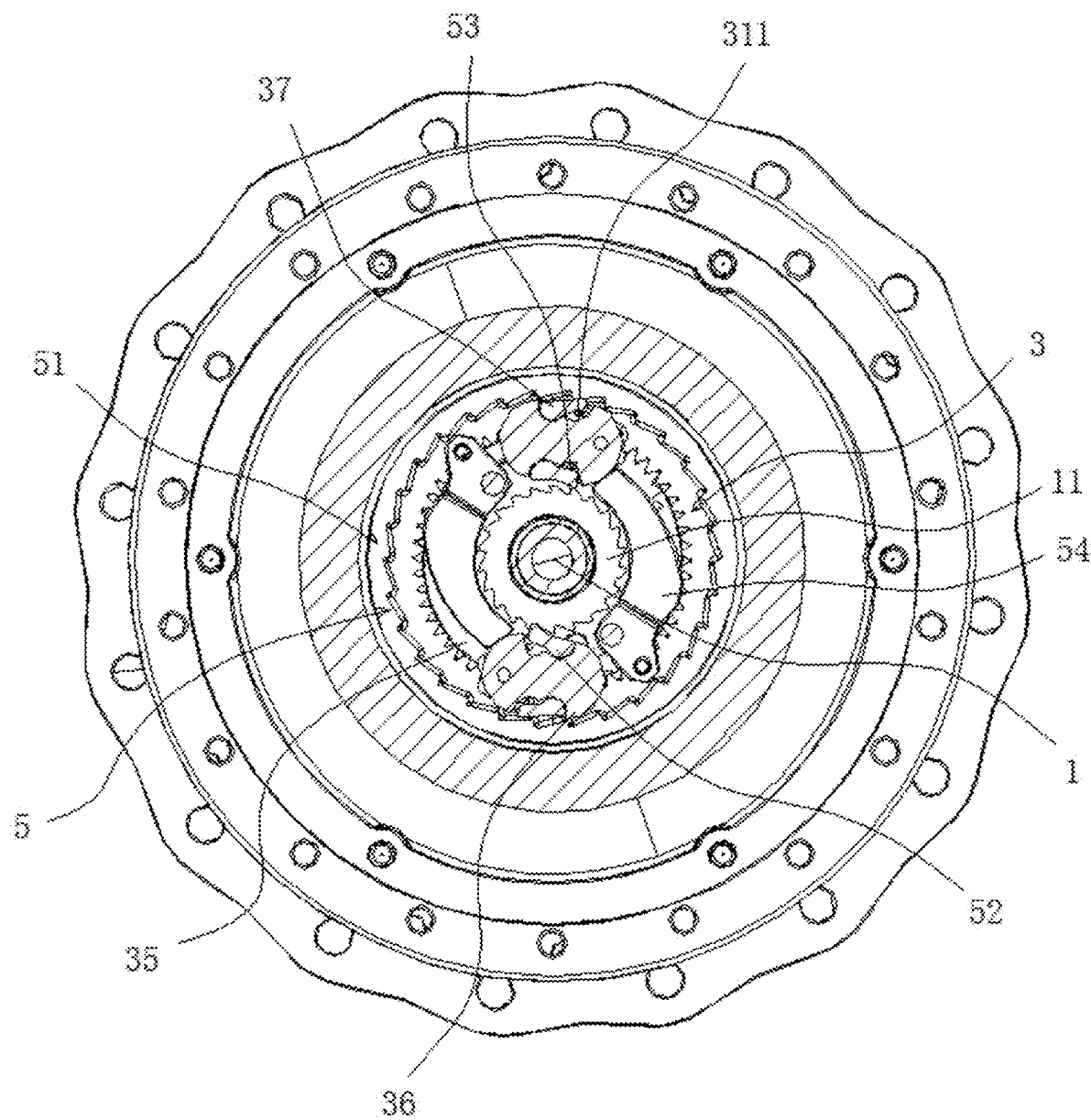
FIG. 6 is a combined cross-sectional view of the first-speed transmission and third-level transmission mechanisms of the present invention.
Figure 7:
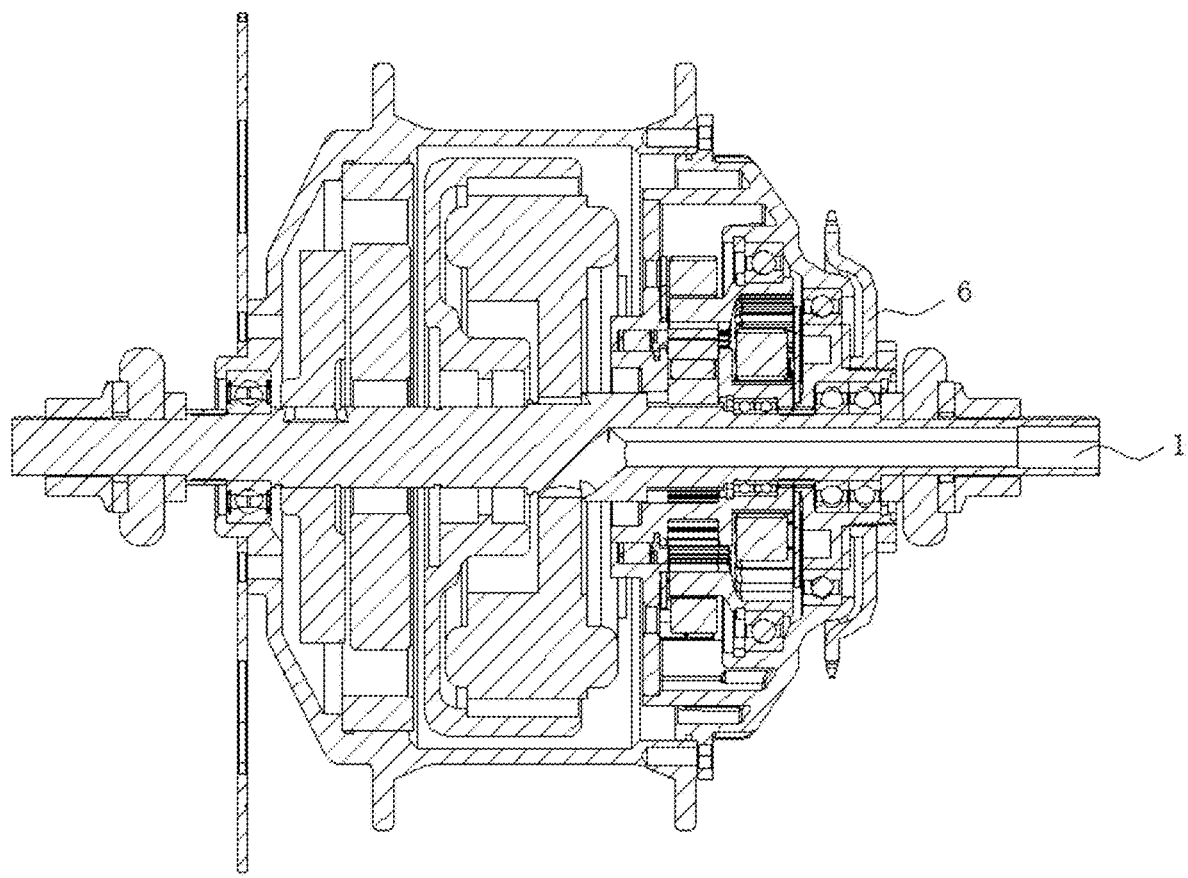
FIG. 7 is a cross-sectional view of the present invention.
In the figures, 1. Central shaft; 2. Centrifugal clutch shifting mechanism; 3. First-level transmission mechanism; 4. Second-level transmission mechanism; 5. Third-level transmission mechanism; 6. Gearbox housing; 7. Composite planetary gear ring; 11. Sun gear; 31. Planetary transmission mechanism; 32. Composite planetary carrier; 33. Planetary gear set; 34. Fourth gear ring; 35. First drive disk; 36. First-speed drive block; 37. First-speed transmission pawl; 38. Power locking mechanism; 39. Mounting shaft; 310. Power locking spring; 311. First pawl compression spring; 41. First centrifugal shifting mechanism; 42. second drive seat; 43. Second-speed drive block; 44. Second-speed transmission pawl; 45. Return spring; 46. Second-speed centrifugal control mechanism; 51. Second centrifugal shifting mechanism; 52. Third-speed transmission pawl; 53. Second centrifugal compression spring; 54. Third-speed centrifugal control mechanism; 71. First gear ring; 72. Second gear ring; 73. Third gear ring.

Referring to FIG. 6, the first centrifugal shifting mechanism 41 includes the second drive seat 42 fixed on the inside of the gearbox housing 6. The side of the second drive seat 42 close to the composite planetary gear ring 7 is fixedly connection with the second-speed drive block 43. The second-speed transmission pawl 44 for engaging the third gear ring 73 is hinged to the inside of the second drive block 43, and the side of the second drive block 43 close to the second-speed transmission pawl 44 is fixedly connected with the return spring 45. The side of the return spring 45 away from the second-speed drive block 43 is hinged to the second-speed transmission pawl 44. The third gear gear 73 is unidirectionally connected to the second-speed transmission pawl 44 on the second drive seat 42, and cooperates with the first centrifugal shifting mechanism 41 to achieve the power transmission and disconnection of one-way transmission. The composite planetary carrier 32 is fixedly connected to the input shaft with a one-way clutch on the other side of the fourth gear gear 34. Its function is to realize one-way transmission through the one-way clutch and the second drive seat 42. One-way transmission power is realized in the first-level transmission mechanism 3, while the second-level transmission mechanism 4 and the third-level transmission mechanism 5 realize clutch overrunning to disconnect the first-speed transmission power.

Referring to FIG. 5, the second-speed centrifugal control mechanism 46 for controlling the second-speed transmission pawl 44 is hinged on one side of the second drive seat 42 close to the composite planetary gear ring 7. When the second-speed centrifugal control mechanism 46 does not reach the set point and generates no centrifugal clutching, the second-speed transmission pawl 44 shrinks and does not engage with the third gear ring 73. When the second-speed centrifugal control mechanism 46 reaches the set point and generates centrifugal clutching, the second-speed transmission pawl 44 springs off to engage with the third gear ring 73. The second centrifugal shifting mechanism 51 internally includes the third-speed transmission pawl 52 that is hinged on a side of the first-speed drive block 36 away from the first-speed transmission pawl 37. There second centrifugal compression spring 53 for pressing and positioning the third-speed transmission pawl 52 is set between the third-speed transmission pawl 52 and the first-speed drive block 36. The outer side of the third-speed transmission pawl 52 is closely linked with the other end of the power locking spring 310. The third-speed centrifugal control mechanism 54 for controlling the third-speed transmission pawl 52 is provided on one side of the first drive disk 35 close to the first-speed drive block 36. The fourth gear ring 34 combines with the inner side one-speed transmission pawl 37 on the first drive disk 35 to form a one-way transmission mechanism. The composite planetary carrier 32 is fixedly connected with the input shaft with a one-way clutch on the other side of the fourth gear ring 34, and its function is to realize one-way transmission through the one-way clutch and the second drive seat 42, to transmit power in one way in the first-level transmission mechanism 3, to realize clutch overrunning and disconnection of the first-speed transmission power in the second-level transmission mechanism 4 and the third-level transmission mechanism 5. When the speed of the third-speed centrifugal control mechanism 54 does not reach the set point and generates no centrifugal clutching, the third-speed transmission pawl 52 shrinks and does not engage with the fourth gear ring 34, and the first-speed transmission pawl 37 engages with the second gear ring 72. When the speed of the third-speed centrifugal control mechanism 54 reaches the set point and centrifugal clutching occurs, the third-speed transmission pawl 52 springs off and engages with the fourth gear ring 34, and the first-speed transmission pawl 37 shrinks and breaks away from the second gear ring 72 or overruns the state. As a result, the centrifugal force of the centrifugal block is less than the force of the spring, and the centrifugal block closes inwardly, pushing the clutch plate to rotate clockwise. As it decelerates, the hub housing moves faster than the input end under the rotation inertia, that is, the ratchet ring moves faster than the pawl, and the gear ring pushes away the pawl, and the clutch plate just clutches into the pawl under the force of the centrifugal block shrinking inwardly, and the pawl enters a closed state. The transmission power is disconnected and upshifted. The area of clutch overrunning due to previous upshifting starts to mesh and transmits power, and the outer side of the third-speed transmission pawl 52 closely links with the other end of the power locking spring 310.

The working principles are as follows:
power is input to the first drive disk 35 through sprockets, pulleys, or gears; the first-speed transmission pawl 37 on the outer side of the first-speed drive block 36 on the first drive disk 35 keeps open outwardly under the action of the power locking spring 310 and the first pawl compression spring 311, so as to transmit power to the ratchet teeth of the composite planetary gear ring 7; the first gear ring 71 and the second gear ring 72 are fixedly connected together; the first gear ring 71 transmits power to the planetary carrier through the planetary gear set 33; the planetary carrier further transmits power to the second drive seat 42 through a first-speed one-way clutch; as the second drive seat 42 is fixedly connected with the gearbox housing 6, power is transmitted to the gearbox housing 6 by the second-speed centrifugal control mechanism 46;

power is input to the first drive disk 35 through sprockets, pulleys, or gears; a centrifugal clutch mechanism is provided on the second drive seat 42; when the speed of the second drive seat 42 reaches a designed value, under the action of the centrifugal force, the centrifugal block opens and pushes the clutch plate to rotate, the second-speed transmission pawl 44 fails due to locking by the clutch plate; the second-speed transmission pawl 44 springs off and meshes with the third gear ring 73, and transmits power to the second drive seat 42 and the gearbox housing 6 at a 1:1 transmission ratio; at this time, the output speed of the transmission is consistent with its input speed, and the planetary mechanism does not participate in the power transmission; the reason is that in the first-speed transmission, there is a one-way clutch transmission mechanism between the composite planetary gear ring 7 and the first-speed drive block 36 in the first-speed transmission, where overruning takes place, and the first-speed transmission fails;

power is input to the first drive disk 35 through sprockets, pulleys, or gears; the second centrifugal shifting mechanism 51 is arranged on the first drive disk 35; when the speed of the first drive disk 35 reaches the design speed of the third-speed transmission, the third-speed transmission pawl 52 of the second centrifugal shifting mechanism 51 is thrown off and opens inwardly; at the same time, the power lock spring 310 compressing the first-speed transmission pawl 37 fails, and the outer side pawl can be closed; power is meshed to the second gear ring 72 through the pawl; the ratchet teeth and the planetary carrier are integrated in structure; power is input through the planetary carrier, and output through the planetary gear ring; the state of the planetary gear directly inputs to the housing in the preceding second-speed transmission. Compared with the second-speed transmission, the third-speed transmission transmit power additionally through the planetary mechanism, and the output speed can be enhanced through the design of gear ratio of the planetary mechanism.

While a presently preferred embodiment of the present invention have been described herein, it should be understood by persons skilled in the art that the invention is not limited to such embodiments; but on the contrary, it is intended to cover such alternatives, modifications and equivalents of the structures, shapes and working principles contained herein, without departing from the spirit and scope thereof.

What is claimed is:

1. A three-speed bicycle transmission structure, wherein the structure comprises a central shaft (1), a three-speed transmission structure and a gearbox housing (6), wherein:
the three-speed transmission, used for switching output modes and realizing three-speed gear shifting, comprises a centrifugal clutch shifting mechanism (2), a composite planetary gear ring (7) and a planetary transmission mechanism (31);
the composite planetary gear ring (7) comprises a first gear ring (71), a second gear ring (72) and a third gear ring (73) fixed to each other, and the three gear rings are arranged concentrically in the axial space of the transmission;

a tooth profile of the first gear ring is an involute gear, a tooth profile of the second gear ring is an inner ratchet tooth, and a tooth profile of the third gear ring is an outer ratchet tooth;

wherein the centrifugal clutch shifting mechanism (2) is used for converting output modes, and the composite planetary gear ring (7) and the planetary transmission mechanism (31) cooperate with the centrifugal clutch shifting mechanism (2) to realize partial gear shifting;

the gearbox housing (6) is used for outputting power.

2. A three-speed bicycle transmission structure according to claim 1, wherein the three-speed transmission structure further comprises a first-level transmission mechanism (3), a second-level transmission mechanism (4) and a third-level transmission mechanism (5) for realizing integral multi-level speed change, and the centrifugal clutch shifting mechanism (2) is used for switching the first-level transmission mechanism (3), the second-level transmission mechanism (4) and the third-level transmission mechanism (5) for different modes of transmission.

3. A three-speed bicycle transmission structure according to claim 2, wherein the first-level transmission mechanism (3) and the third-level transmission mechanism (5) include the planetary transmission mechanism (31) for realizing the multi-speed transmission of the gearbox housing (6), and an interior of the planetary transmission mechanism (31) includes a composite planetary carrier (32); and the planetary transmission mechanism (31) is a deceleration transmission in the first-level transmission mechanism (3), and an acceleration transmission in the third-level transmission mechanism (5).

4. A three-speed bicycle transmission structure according to claim 3, wherein the three-speed transmission mechanism realizes the different transmission modes of the planetary transmission mechanism (31) through the centrifugal clutch shifting mechanism (2) cooperating with the composite planetary gear ring (7) and the composite planetary carrier (32);

a first centrifugal shifting mechanism (41) for centrifugal clutch shifting is included inside the second-level transmission mechanism (4), and a second centrifugal shifting mechanism (51) for centrifugal clutch shifting is included inside the third-level transmission mechanism (5);

the first centrifugal shifting mechanism (41) comprises a rotating speed triggered second-speed centrifugal control mechanism (46), and the second centrifugal shifting mechanism (51) comprises a speed-triggered third-speed centrifugal control mechanism (54);

the first centrifugal shifting mechanism (41) cooperates with the composite planetary gear ring (7) for shifting the deceleration transmission to normal transmission, and the second centrifugal shifting mechanism (51) cooperates with the composite planetary carrier (32) for shifting the normal transmission to acceleration transmission.

5. A three-speed bicycle transmission structure according to claim 4, wherein a sun gear (11) is fixedly connected to an outer side of the central shaft (1), and a planetary gear set (33) adapted to the sun gear (11) is rotatably connected inside the composite planetary carrier (32);

an outer side of the planetary gear set (33) meshes and connects with the first gear ring (71), and an inner side of the planetary gear set (33) meshes and connects with the sun gear (11); the first gear ring set (71) combines the planetary gear set (33) installed on the composite planetary carrier (32) and the sun gear (11) on the central shaft (1) to form a planetary variable-speed transmission structure.

6. A three-speed bicycle transmission structure according to claim 5, wherein a first drive disk (35) rotatably connected to the outer side of the central shaft (1) is included inside the first-level transmission mechanism (3), a first-speed drive block (36) is fixedly connected to an outer side of the first drive disk (35), a first-speed transmission pawl (37) adapted to the second gear ring (72) is hinged to an outer side of the first-speed drive block (36), and a power locking mechanism (38) for reinforcement is provided on an inner side of the first-speed transmission pawl (37).

7. A three-speed bicycle transmission structure according to claim 6, wherein the first-speed drive block (36) is located on an inner side of the second gear ring (72);

the power locking mechanism (38) comprises a mounting shaft (39) fixed at the upper end of the first drive disk (35), a power locking spring (310) rotatably connected to the outer side of the mounting shaft (39), and one end of the power locking spring (310) is closely linked with the outer side of the first-speed transmission pawl (37);

the first-speed transmission pawl (37) cooperates with the second gear ring (72) to form a locking structure of one-way transmission, and the power locking spring (310) cooperates with the first-speed transmission pawl (37) to form a locking enforcement structure;

a first pawl compression spring (311) for pressing and positioning the first-speed transmission pawl (37) is arranged between the first-speed drive block (36) and the first-speed transmission pawl (37);

the second gear ring (72) and the first-speed transmission pawl (37) on the outer side of the first drive disk (35) constitute one-way transmission of the first-speed drive blocks of the first-level transmission mechanism (3) and the second-level transmission mechanism (4) toward the composite planetary gear ring (7).

8. A three-speed bicycle transmission structure according to claim 4, wherein the first centrifugal shifting mechanism (41) comprises a second-speed drive block (43) inside, and a second-speed transmission pawl (44) for engaging the third gear ring (73) is hinged to the inner side of the second-speed drive block (43).

9. A three-speed bicycle transmission structure according to claim 8, wherein a return spring (45) is fixedly connected to a side of the second-speed drive block (43) close to the second-speed transmission pawl (44), and the side of the return spring (45) away from the second-speed drive block (43) is hinged to the second-speed transmission pawl (44);

the third gear ring (73) is unidirectionally connected to the second-speed transmission pawl (44) on a second drive seat (42), and cooperates with the first centrifugal shifting mechanism (41) to achieve the power transmission and disconnection of unidirectional transmission.

10. A three-speed bicycle transmission structure according to claim 6, wherein the second centrifugal shifting mechanism (51) comprises a three-speed transmission pawl (52) inside, and the three-speed transmission pawl (52) is hinged to a side of the first-speed drive block (36) away from the first-speed transmission pawl (37);

a second centrifugal compression spring (53) for pressing and positioning the third-speed transmission pawl (52) is arranged between the third-speed transmission pawl (52) and the first-speed drive block (36);

the outer side of the third-speed transmission pawl (52) is closely linked with the other end of the power locking spring (310);

the third-speed centrifugal control mechanism (54) for controlling the third-speed transmission pawl (52) is provided on the side of the first drive disk (35) adjacent to the first-speed drive block (36).

11. A three-speed bicycle transmission structure according to claim 10, wherein when the speed of the third-speed centrifugal control mechanism (54) does not reach a set point and the centrifugal clutching is not generated, the third-speed transmission pawl (52) shrinks and does not engage with the fourth gear ring (34), and the first-speed transmission pawl (37) engages with the second gear ring (72);

when the speed of the third-speed centrifugal control mechanism (54) reaches the set point and centrifugal clutching is generated, the third-speed transmission pawl (52) springs off and engages with a fourth gear ring (34), and the first-speed transmission pawl (37) shrinks and breaks away from the second gear ring (72) or overruns the state.

12. A three-speed bicycle transmission structure according to claim 1, wherein the shifting method is as follows:

the power is input to the composite planetary gear ring (7) through a sprocket, a belt pulley or a gear, and is output from the composite planetary carrier (32) through the planetary transmission mechanism (31) to realize deceleration as a first speed shift;

the composite planetary gear ring (7) shifts the deceleration transmission to normal transmission as a second speed shift through collaboration with the first centrifugal shifting mechanism (41);

the composite planetary gear ring (7) shifts the normal transmission into acceleration transmission as a third speed shift through collaboration with the second centrifugal shifting mechanism (51).

13. The gear-shifting method of a three-speed bicycle transmission structure according to claim 6, wherein the power input to the composite planetary gear ring (7) is required to be firstly input to the first drive disk (35), and the first-speed transmission pawl (37) on the first drive disk (35) keeps open outwardly to transmit power to the ratchet teeth of the composite planetary gear ring (7).

14. The gear-shifting method of a three-speed bicycle transmission structure according to claim 8, wherein the output from the composite planet carrier (32) particularly comprises; the composite planet carrier (32) transmitting power to a second driving seat (42) that is fixedly connected to the gearbox housing (6), and the power is output by the housing.

15. The gear-shifting method of a three-speed bicycle transmission structure according to claim 14, wherein the shifting from deceleration transmission to normal transmission particularly relates to:

a centrifugal clutch mechanism is provided on the second drive seat (42); when the second drive seat (42) reaches the set point with the speed of the gearbox housing (6), a centrifugal block of the second-speed centrifugal control mechanism (46) is opened by a centrifugal force and pushes a clutch plate of the second-speed centrifugal control mechanism (46) to lock-unlock the second-speed transmission pawl (44), causing it to disengage and fail to lock; the second transmission pawl (44) bounces off and engages with the third gear ring (73), and transmits power to the second drive seat (42) and the gearbox housing (6) at a 1:1 transmission ratio; at this time, the output speed of the transmission is consistent with its input speed, and the planetary mechanism does not participate in power transmission.

16. The gear-shifting method of a three-speed bicycle transmission structure according to claim 11, wherein the shifting from normal transmission to acceleration transmission relates to:

the second centrifugal shifting mechanism (51) is arranged on the first drive disk (35); when the speed of the first drive disk (35) reaches the design speed for a third-speed transmission, under the action of centrifugal force, a centrifugal block of the third-speed centrifugal control mechanism (54) is opened and pushes a clutch plate of the third-speed centrifugal control mechanism (54) to unlock the third-speed transmission pawl (52); the third-speed transmission pawl (52) is thrown off and opens inwardly, and the power locking spring (310) pressing the first-speed transmission pawl (37) fails; the power is meshed to the fourth gear ring (34) on the composite planetary carrier (32) through the pawl; the power is input through the composite planetary carrier, and output through the composite planetary gear ring, and the planetary mechanism adds to the output speed.

* * * * *